US007010213B2

(12) United States Patent
Yeend et al.

(10) Patent No.: US 7,010,213 B2
(45) Date of Patent: Mar. 7, 2006

(54) MEDIA PLAYING SYSTEM AND PROCESS

(75) Inventors: Shane Antony Yeend, Grange (AU); Shane Donald Pike, Santa Monica, CA (US)

(73) Assignee: ImaginationDVD Corp., Santa Monica, CA (US)

( * ) Notice: Subject to any disclaimer, the term of this patent is extended or adjusted under 35 U.S.C. 154(b) by 247 days.

(21) Appl. No.: 10/452,781

(22) Filed: May 31, 2003

(65) Prior Publication Data

US 2004/0240861 A1 Dec. 2, 2004

(30) Foreign Application Priority Data

Jul. 15, 2002 (AU) .............................. 2002950161

(51) Int. Cl.
H04N 9/79 (2006.01)
(52) U.S. Cl. .......................... 386/35; 386/69; 386/83; 273/292; 463/48
(58) Field of Classification Search ................ 386/35, 386/52, 69, 83, 125; 273/292; 463/48
See application file for complete search history.

(56) References Cited

U.S. PATENT DOCUMENTS

| 4,667,314 A | * | 5/1987 | Iwashima | .............. 369/178.01 |
| 4,787,073 A | | 11/1988 | Masaki | |
| 4,940,239 A | | 7/1990 | Tuttle | |
| 4,944,519 A | | 7/1990 | Canela | |
| 5,011,156 A | | 4/1991 | LaChance, Jr. et al. | |
| 5,106,097 A | | 4/1992 | Levine | |
| 5,120,230 A | | 6/1992 | Clark et al. | |
| 5,121,928 A | | 6/1992 | Salerno-Sonneberg | |
| 5,125,667 A | * | 6/1992 | Richards | ..................... 273/292 |
| 5,145,184 A | | 9/1992 | Yearick et al. | |
| 5,255,923 A | | 10/1993 | Bennett | |
| 5,393,071 A | | 2/1995 | Best | |
| 5,393,072 A | | 2/1995 | Best | |
| 5,393,073 A | | 2/1995 | Best | |
| 5,472,207 A | | 12/1995 | Sullivan et al. | |
| 5,589,945 A | | 12/1996 | Abecassis | |

(Continued)

FOREIGN PATENT DOCUMENTS

DE     199 04 007 A 1     8/2000

(Continued)

OTHER PUBLICATIONS 17 pages of website from "Scene It?" The DVD Game—Copyright 2003 Screenlite LLC.

(Continued)

*Primary Examiner*—James J. Groody
*Assistant Examiner*—James A. Fletcher
(74) *Attorney, Agent, or Firm*—Foley & Lardner LLP

(57) ABSTRACT

A system and method of playing recorded content on a DVD player employs software instructions on a DVD storage medium to control a DVD-Video player to make pseudo-random selections of content items from the DVD storage medium. Each content item may include an individual video sequence or a string of video sequences. Each content item is associated with a respective identification codes, such that each content item is associated with a corresponding identification code that is different from the identification codes of other content items. The DVD player controller is controlled to select, by pseudo-random selection or generation, at least one of the identification codes from the plurality of identification codes. The DVD player controller may be controlled to perform that pseudo-random selection or generation with software stored on (and read from) the DVD storage medium.

39 Claims, 5 Drawing Sheets

U.S. PATENT DOCUMENTS

| | | | |
|---|---|---|---|
| 5,613,909 | A | 3/1997 | Stelovsky |
| 5,782,692 | A | 7/1998 | Stelovsky |
| 5,841,741 | A | 11/1998 | Freeman |
| 5,857,675 | A * | 1/1999 | Hertel ................. 273/254 |
| 5,911,582 | A | 6/1999 | Redford et al. |
| 6,159,014 | A | 12/2000 | Jenkins et al. |
| 6,419,232 | B1 | 7/2002 | Sturdevant, II |
| 6,496,981 | B1 | 12/2002 | Wistendahl et al. |
| 6,758,754 | B1 | 7/2004 | Lavanchy et al. |
| 2003/0046638 | A1 | 3/2003 | Thompson |
| 2004/0022520 | A1 * | 2/2004 | Kinzer et al. ............ 386/69 |

FOREIGN PATENT DOCUMENTS

| | | |
|---|---|---|
| EP | 0133930 | 7/1984 |
| EP | 0 133 930 | 3/1985 |
| EP | 1 078 666 A2 | 7/2000 |
| EP | 1147793 A2 | 10/2001 |
| GB | 2219217 A | 6/1989 |
| GB | 2 234 446 A | 7/1989 |
| GB | 2219217 | 12/1989 |
| GB | 2 353 393 | 2/2001 |
| GB | 2353393 A | 2/2001 |
| JP | 06 089548 | 3/1994 |
| WO | WO 97/34671 | 9/1997 |

OTHER PUBLICATIONS

Webpage article: "Scene It?" The DVD Game Copyright 2003, Screenlife, LLC—18 pages.

Webpage article: "Zoo Digital Publishing"—Zoo Digital Group plc:Zoo Digital Publishing—copyright 2002-2004—5 pages.

Supplemental European Search Report for EP application number: EP 03 76 3515 Dated Jul. 6, 2005.

* cited by examiner

MEDIA PLAYING SYSTEM AND PROCESS

FIELD OF THE INVENTION

The present invention relates to systems and processes employing or including a conventional media player and, in particular embodiments, to such systems and processes employing or including a DVD optical disc player. Embodiments of the present invention include a DVD storage medium, on which a plurality of content items are stored with software for programming a DVD-Video player controller to select by pseudo-random selection, at least one of the stored content items for playing. Further embodiments of the present invention relate to systems including a DVD storage medium as described above in combination with a DVD-Video player. Yet further embodiments relate to processes of making and using the DVD storage medium in accordance with aspects of the invention.

RELATED ART

Various modern media playing devices have electronic control circuitry with some programming capabilities for providing limited functions, such as selecting content items from a media storage device and playing selected items. For example, typical digital video disc (or digital versatile disc) DVD players include controllers capable of selecting certain content items from a DVD storage disc and playing the selected items in a programmed order.

In many societies, DVD has become a very popular media playing choice. DVD-Video players and storage media can be relatively inexpensive and easy to find. DVD-Video players can be used with conventional television sets, which are already in many modern homes, office buildings, educational facilities, and the like. As a result, DVD-Video players are also already presently in a relatively large percentage of homes, offices and other facilities in certain countries in Europe, Asia and North America, and is increasing in popularity in those and other regions of the world.

Embodiments of the present invention employ or include conventional DVD-Video players, to allow popular use and enjoyment by the large population that already own or have access to such players. In addition, such embodiments broaden the utility of conventional DVD-Video players, which can further increase the popularity of such players and improve the sales of such players.

The DVD Forum specifies the basic technology for DVD, including physical formats (such as DVD-ROM or DVD-RAM) and application formats (such as DVD-Video or DVD-Audio). The several physical formats or recording types define the physical data storage parameters and include formats ranging from DVD-ROM, which can only be read by the consumer's hands, to DVD-RAM, which is multi-rewritable by the user.

The application formats describe the structure of the data stored on the disc. The application formats include DVD-ROM, DVD-Video, DVD-Video Recording, DVD-Audio, DVD-Audio Recording, DVD Stream Recording, and SACD. There are also special application formats for game consoles, such as Sony Playstation II™, Microsoft X-Box™, Nintendo Cube™, and the like.

DVD-Video defines how video programs, such as movies, are stored on disc and played in a DVD-Video player. The player may be a stand-alone device, or it may be part of a personal computer system, in which case it would also be capable of reading the DVD-ROM application format.

While there is a wide distribution of DVD discs for sale and rental, these sales or rentals mostly relate to the most widely available technology for reproduction, namely, the typical DVD-Video player. The typical DVD-Video player has a primary function of simply reproducing output from a DVD storage medium, as a video sequence. A video sequence may be a movie, still, animated graphics, a combination of still or moving images, or the like. A video sequence may include a soundtrack of speech, music, sound effects or other type of sound.

Regardless of what other data may be on a DVD storage medium, the typical DVD-Video player may only be able to use data in the DVD-Video application format. The typical DVD-Video player, therefore, may only have very limited control facilities, which are intended to be useful only for immediate control of and display of a video output. Thus, the conventional manner of using such a typical DVD-Video player has been limited to simple reproduction of video sequences, such as playing movies or video game graphics.

SUMMARY

Embodiments of the present invention address a need in the industry to improve the functionality and utility of a typical DVD-Video player.

Embodiments of the present invention relate to a method of playing recorded content on a DVD player. In such embodiments, the controller included in typical DVD players is configured to select from a plurality of content items stored on a DVD storage medium and play selected content items. A DVD storage medium stores a plurality of content items. Each content item may include an individual video sequence or a string of video sequences. Each content item is associated with a respective identification codes, such that each content item is associated with a corresponding identification code that is different from the identification codes of other content items. The DVD player controller is controlled to select, by pseudo-random selection or generation, at least one of the identification codes from the plurality of identification codes. In a preferred embodiment, the DVD player controller is controlled to perform that pseudo-random selection or generation with software stored on (and read from) the DVD storage medium. The selected identification code is stored in DVD player memory and the DVD player controller controls the player to play the string of content items corresponding to each selected identification code.

In one embodiment of the invention a DVD storage medium stores a program to effect when a DVD-Video player will make pseudo-random selections of certain content items stored on the DVD storage medium to effect the playing of a game. Each content item available for pseudo-random selection may include a question to be displayed to the user and, following a defined delay time, a correct answer to that question to be displayed to the user. Other sequences of video and other content items may be employed to effect other games.

In one embodiment, each content items (or string of content items) is associated with an identification code or number. The DVD player controller is instructed to select (or generate) a number, pseudo-randomly, from among the content item numbers available. The DVD player is controlled to play the content item (or string of content items) associated with the selected number.

In a further embodiment, the DVD player stores a plurality of lists or banks of content items. The DVD player controller is instructed to select (or generate) a number corresponding to one of the lists or banks of content items and, then, display the content items in the list or bank, in the order specified by the list or bank.

Various embodiments may be employed with game boards, cards, game pieces or other objects that are associated, in a game, with the content items stored on the DVD storage medium. In such embodiments, content items that are selected (or generated) pseudo-randomly, are associated in a specified manner with the game board, cards, game pieces or other objects, to effect a score or progress in a game.

BRIEF DESCRIPTION OF DRAWINGS

Referring now to the drawings in which like reference numbers represent corresponding parts throughout.

DETAILED DESCRIPTION OF PREFERRED EMBODIMENTS

Figure 1:
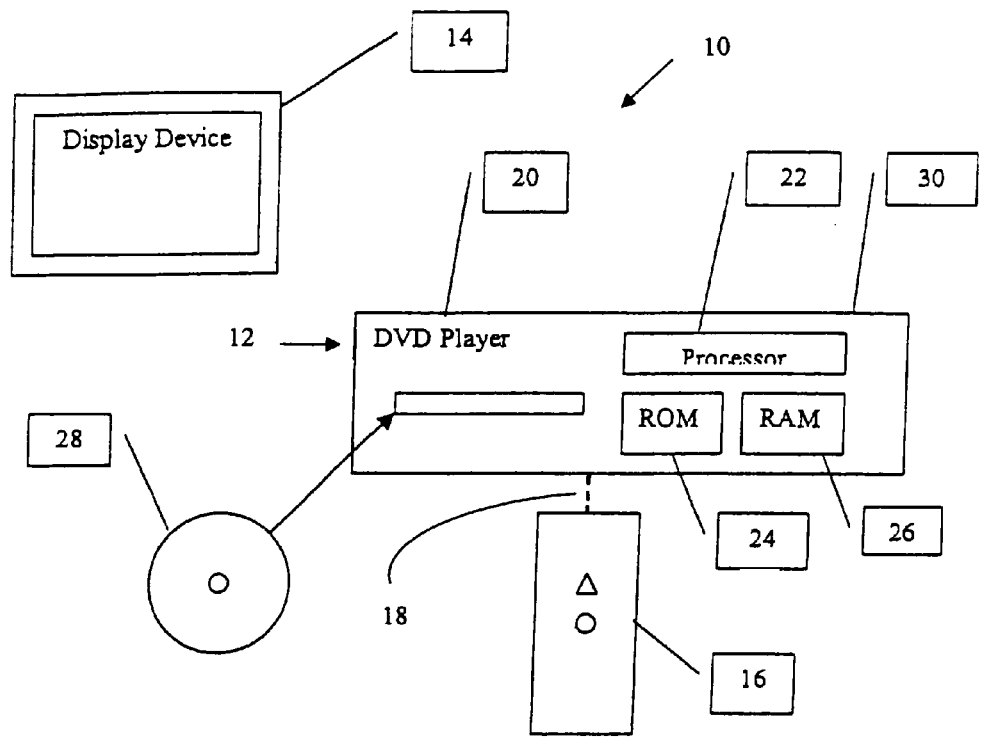
FIG. 1 is a generalized block diagram of a system according to an embodiment of the present invention.

The following detailed description is of the best presently contemplated mode of implementing the invention. This description is not to be taken in a limiting sense, but is made merely for the purpose of illustrating the general principles of the invention. The scope of the invention is best defined by the appended claims.

The present invention relates to systems and processes employing or including a conventional media player, such as, but not limited to, a DVD optical disc player. Embodiments of the present invention include a DVD storage medium, on which a plurality of content items are stored with software for programming a DVD-Video player controller to select by pseudo-random selection, at least one of the stored content items for playing. Further embodiments of the present invention relate to systems including a DVD storage medium as described above and a DVD-Video player. Yet further embodiments relate to processes of making and using the DVD storage medium in accordance with aspects of the invention.

According to embodiments of the present invention, content items are selected and played from a DVD storage medium in accordance with operating instructions that provide for a pseudo-random (or random appearing) selection. More specifically, the DVD player is controlled by operating instructions to provide a pseudo-random (or random appearing) selection of content items from a plurality of content items stored on a DVD storage medium. True randomness is not practical with modern electronic systems and, thus, the terms pseudo-random and random are used, interchangeably herein, to refer to an appearance of randomness to the ordinary user.

In particular embodiments, the content items stored on the DVD storage medium relate to an aspect or element of a game, and the pseudo-random (or random appearing) selection of content items also relates to an aspect or element of the game and/or provides a likely fresh or new experience each time the game is played (at least for a suitable number of game playing experiences). For example, the content items stored on the DVD storage medium may relate to strings of questions and answers that form part of a game. A string of content items may include, for example, at least one content item that includes a question and at least one content item that includes a corresponding answer. In such embodiments, instructions for controlling the DVD player provide for a pseudo-random (or random appearing) selection of strings of content items from a plurality of strings of content items stored on a DVD storage medium. Thus, a selected string includes, for example, at least one question content item and at least one corresponding answer content item.

Various representative examples of games employing content items or strings of content items and pseudo-random (or random appearing) selection are described in further detail below. Other embodiments may employ multiple content items and pseudo-random (or random appearing) selection for purposes other than games and amusement, including, but not limited to, educational, artistic or other suitable purposes, also as described in more detail below.

Preferred embodiments of the invention are designed to operate with or include a conventional DVD-Video player, to allow popular use and enjoyment by the large population that already own or have access to such players and to broaden the utility of conventional DVD-Video players. Many popular, conventional DVD-Video players are capable of operating in accordance with some basic functions relating to selection of content items on a DVD storage medium. The popular usage of conventional DVD-Video players has been, primarily, limited to the reproduction of video sequences stored on DVD storage media (such as playing of pre-recorded movies, video game sequences, or the like). As a result, popular, conventional DVD-Video players typically include relatively limited electronic controllers capable of providing certain limited pre-set functions relating to the selection and playing of content items, such as seek, scan and other basic selection-related functions.

However, typical, modern DVD-Video player controllers are also capable of reading and operating in accordance with some limited control instructions stored on a DVD medium. By employing existing functions and capabilities of such typical DVD-Video players, embodiments of the present invention may be enjoyed by a large population of existing DVD-Video player owners and may further increase the popularity of DVD-Video players. In yet other embodiments, control instructions may be received by the DVD-Video player from a network or on-line source, provided the DVD-Video player has appropriate network interface and communication functions.

A system 10 according to an embodiment of the present invention is shown in FIG. 1, wherein a conventional DVD-Video player 12 is connected to a television set or monitor 14, in a conventional manner. The DVD-Video player 12 includes user-input means, such as control buttons, knobs, keys or other suitable user-controlled operators. Preferably, the user-input means includes a remote control device 16, which communicates with the DVD-Video player 12 through a wired or wireless communication link 18. As described above, the DVD-Video player 12 also has a controller 20 for controlling selection and playing functions of the player. The controller 20 may comprising control electronics, such as a processor 22, a permanent memory (such as ROM 24) for storing permanent operating instructions and a relatively small operating register or memory (such as RAM 26).

The system 10 in FIG. 1 further includes a DVD storage medium (disc) 28, which is configured to contain a plurality of content items, such as video sequences, in accordance with further principles of the present invention described below. The DVD storage medium 28 also stores software for instructing a DVD player controller to select and play particular content items (e.g., video sequences) and, in accordance with embodiments of the present invention, to provide a pseudo-random (or random-appearing) selection of content items (e.g., video sequences) from the plurality of content items (e.g., video sequences) stored on the DVD storage medium.

In one embodiment, the software instructions stored on the DVD storage medium instruct the DVD player controller to employ a pseudorandom number generator device in typical DVD player. Such pseudorandom number generators have been included in conventional DVD players to allow a user to select (by operation of a user-input button) a shuffling function to shuffle the order of play of content items on the DVD. An embodiment of the present invention employs the existing pseudorandom number generator in a conventional DVD player, but controls the pseudorandom number generator to operate at specified times and for pseudorandomly selecting among specified content items, in accordance with a game, educational artistic or other suitable function. In a further embodiment, some or all of the instructions for pseudo-random selection are provided to the DVD-Video player controller from other sources, such as an external memory source, a network source or an on-line source, for example, through a network (or other external) connection 30.

The DVD storage medium 28 may be created or authored using standard DVD Forum compliant authoring tools, for example, but not limited to, DVD Maestro™ from Spruce Technologies or Scenarist™ from Sonic. Such tools allow the elements of a DVD storage disc to be assembled in accordance with embodiments of the present invention. In addition, such tools provide access to a limited programming language. The programming language provides a mechanism to add DVD script to the DVD storage medium, to provide to the DVD-Video player instructions to monitor change and react to the values of the sixteen 16-bit memory registers (or other registers, storage or memory in the player) provided by the DVD-Video player standard and provide a pseudo-random number generation routine.

The DVD storage medium 28 is configured to store a relatively large number of content items, such as individual video sequences. In some preferred embodiments, the video sequences represent or provide events of a game, such as game questions, game answers or game action instructions (for example, instructing a player to move to a defined position or take a particular action relevant to a game). In other embodiments, the video sequences represent events for educational, artistic or analytical functions. As described in more detail below, the combination of the plurality of stored video sequences and the ability of the DVD-Video player controller to be controlled to make pseudo-random (or random-appearing) selections from among the plurality of sequences may be employed in a variety of amusement, educational or artistic activities and processes in accordance with embodiments of the present invention.

In some embodiments, the system 10 may also include a board, recording sheet or other mechanism for recording or indicating a user's score or progress in a game, educational, artistic or analytical activity. For example, the system 10 may include a game board and objects (game pieces) that may be moved to locations on the game board, based on the user's score or progress in a game involving randomly selected video sequences. Alternatively, or in addition, the system 10 may include a set of cards, such as a deck of playing cards, educational quiz cards, analytical tool cards or the like, to employ with randomly selected video sequences in game, educational, artistic or analytical processes. In yet further embodiments, the system 10 may include other objects that are used with randomly selected video sequences, in game, educational or artistic, including, but not limited to, recording pads for recording scores and drawing or writing utensils for user-end activities associated with the content items on the DVD storage medium, or the like.

Figure 2:
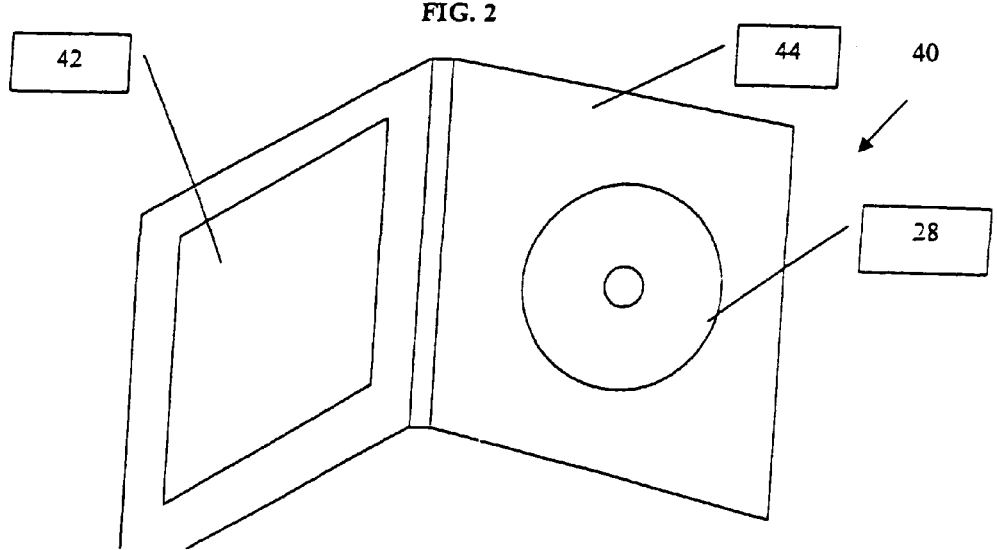
FIG. 2 is a generalized representation of a system according to another embodiment of the present invention.

Thus, the system 10 of FIG. 1, which includes a DVD player 12 and DVD storage medium 28, may further include a game board, cards or other objects (not shown in FIG. 1) for use in a process associated with randomly selected video sequences on the DVD storage medium 28. In further embodiments, as shown in FIG. 2, a system 40 is for use with a DVD-Video player, such as a player 12, and includes a DVD storage medium 28 and a game board, cards or other objects 42. For example, as shown in FIG. 2, a game board 42 may be folded and located in a container 44, with the disc 28 and distributed as a package or system 40, for use with a DVD-Video player. A system according to yet further embodiments of the present invention comprises only the DVD storage medium, on which a plurality of content items are stored with software for programming the DVD player controller to select by pseudo-random selection, at least one of the stored content items for playing.

Representative examples of processes employing systems according to embodiments of the present invention are described below. Further embodiments of the present invention may employ the above-described systems in other processes involving pseudo-random selection from a plurality of video sequences and, thus, the invention is not limited to the specific example processes described herein.

A first representative example comprises a process for playing a game involving questions relating to content items stored on the DVD storage medium (disc) 28. The DVD storage medium 28 includes a first plurality of randomly selectable content items, such as video sequences. Additional content items (such as video sequences relating to rules, how-to-play instructions, introductions, exit messages, or the like) may also be stored on the DVD storage medium, as described below.

Each randomly selectable content item (e.g., video sequence) has a corresponding identification code, such as a number within a pre-defined range or set of numbers. The identification code or numbers may be used to identify the location on the DVD storage medium at which the corresponding content item is stored. The identification code or number for each content item may be stored, in association with its corresponding content item, on the DVD storage medium 28, in a manner that allows the DVD-Video player controller to locate a stored content item by its identification code or number. As described above, the DVD storage medium 28 may also store software instructions for instructing a DVD-Video player controller to select, by pseudo-random selection, identification codes or numbers within the pre-defined range or set.

Figure 3:
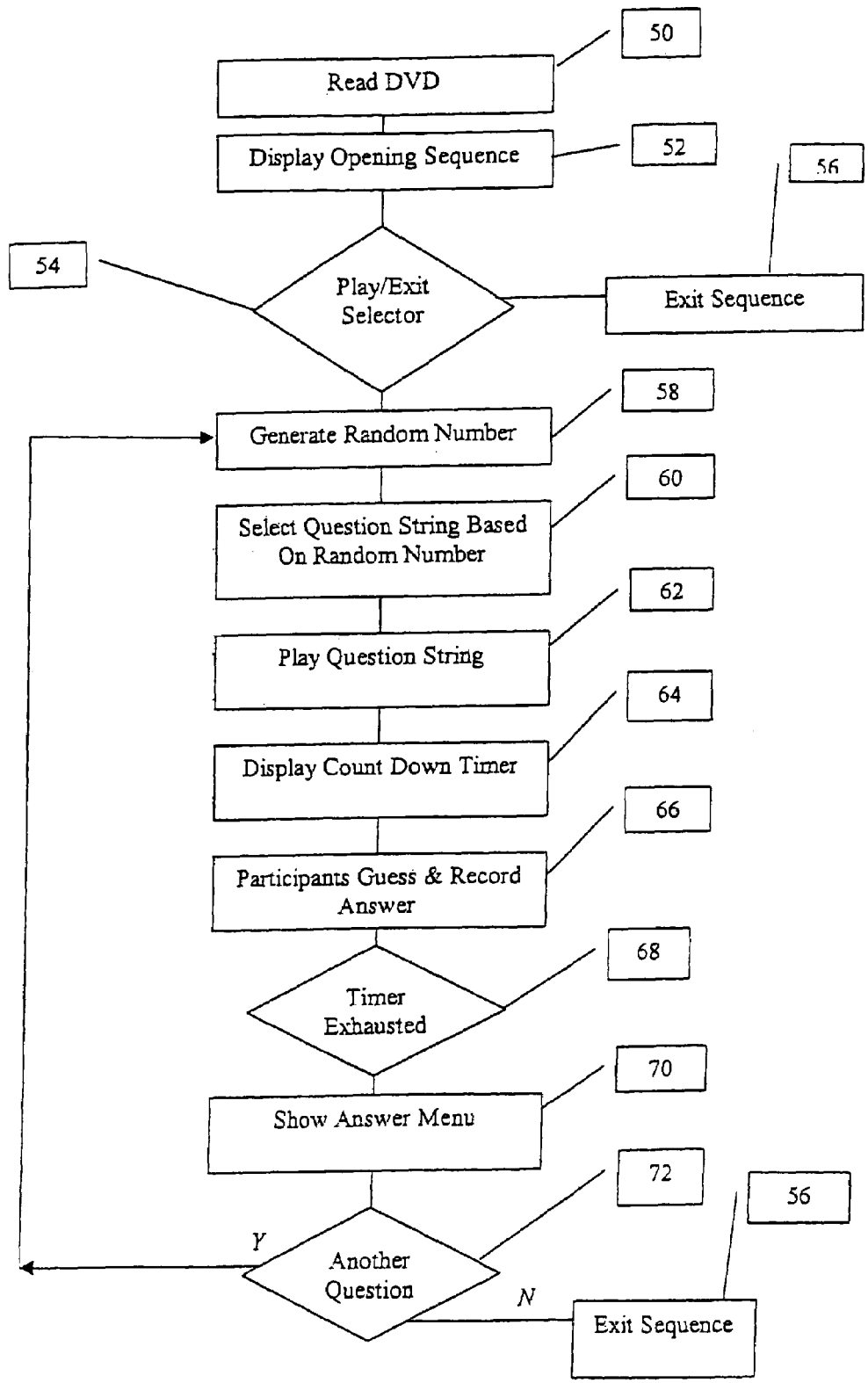
FIG. 3 is a flow chart, representing an example process according to an embodiment of the present invention.

With reference to FIG. 3, the process may proceed, for example, after the DVD storage medium 28 has been inserted in the DVD player. In particular, the DVD player is controlled, in a conventional manner to begin reading 50 the DVD storage medium and begin playing 52 an opening sequence. The opening sequence may include a display of information, such as copyright notices, disclaimers, warnings, authorship and other credits. In some embodiments, the opening sequence may be omitted.

The process proceeds with the playing of an introduction sequence related to the particular game and/or related to the content associated with a plurality of randomly selectable video sequences also stored on the DVD storage medium. The introduction sequence may include characters, actors, sets or graphics associated with the plurality of randomly selectable video sequences. Thus, for example, a popular actor or cartoon character from one or more of the randomly selectable video sequences may be the subject of the introduction sequence, introducing the viewing user to the game.

In an example embodiment, either following or as part of the introduction sequence, a first menu screen may be displayed to the user. The first menu may provide the user with multiple selectable options 54, such as RULES, HOW TO PLAY and START (or PLAY). In other embodiments, other suitable, user-selectable menu items may be displayed as part of a first menu (such as advertisement or promotional tags that cause the display of a promotion video and/or audio content item when selected, or education or topic-of-interest tags that display a video and/or audio content item related to an educational or interesting topic). The first menu may also include an exit selection, to allow the user to exit the process, in which case the user may be provided an exit video sequence 56.

The exit video sequence also may related to the particular game and/or to the content associated with a plurality of randomly selectable video sequences also stored on the DVD storage medium. Thus, the exit video sequence may also include characters, actors, sets or graphics associated with the plurality of randomly selectable video sequences. The exit video sequence may include a message, thanking the user for playing the game and/or advertising additional games. The user may select a menu option through user input means, such as the remote control device 16. Thus, the user may be instructed to select particular operators on the remote control device 16 to effect a selection of one of the available options. In yet further embodiments, no first menu items are displayed and, instead, the process proceeds to the generation of a random number 58, described below.

If the user selects the RULES option from the first menu, then the process proceeds with a routine in which a video sequence showing game rules is displayed to the user. Audio may accompany the rules, for example, as one or more voices reading the rules. In one embodiment, the voice or voices reading the rules may be those of one or more actors or characters associated with the plurality of randomly selectable video sequences stored on the DVD medium. Alternatively or in addition, the RULES option may provide the user with further menus, to allow the user to select specific rules or categories of rules for which additional information is desired. Again, the user may be instructed to select particular menu items by selecting particular operators on the remote control device 16. The RULES routine either automatically ends with the return of the first menu or provides a user-selectable option on a RULES menu for returning to the first menu.

If the user selects the HOW TO PLAY option from the first menu, then the process proceeds with a routine in which a video sequence is played, showing a demonstration of the game being played. In one embodiment, the demonstration may be conducted by one or more actors or characters associated with the plurality of randomly selectable video sequences stored on the DVD medium. Thus, for example, in contexts in which the randomly selectable video sequences are, for example, clips of Disney™ cartoons or movies, the HOW TO PLAY option may provide a video sequence of Mickey Mouse™ (or other popular Disney character) holding a remote control device and demonstrating how a user may select options as part of the game playing process. The HOW TO PLAY routine either automatically ends with the return of the first menu or provides a user-selectable option for returning to the first menu.

If the user selects the START (or PLAY) option from the first menu, then the process proceeds with a START routine. As part of the START (or PLAY) routine, a starting video sequence may be displayed, to inform the user that the game is starting. The DVD-Video player controller is then controlled to make a pseudo-random selection of a video sequence from the first plurality of stored sequences, for playing to the user.

For example, the DVD player registers may be initialized or zeroed. The DVD script authored on the DVD on the DVD disc instructs the DVD-Video player controller to select or generate a number by pseudo-random selection or generation 58, within a range or set of available numbers. The available range or set of numbers corresponds to all of the identification codes or numbers of the first plurality of stored video sequences. In response, the DVD-Video player controller provides (by pseudo-random selection or generation) a number from the available range or set and stores the number in a memory location in the DVD-Video player registers. Thus, the pseudo-randomly selected (or generated) number provided by the DVD-Video player controller corresponds to the identification code (or number) of one of the plurality or randomly selectable content item (or video sequence) stored on the DVD storage medium 28.

In a preferred embodiment, the pseudo-randomly selected (or generated) number corresponds to a string of video sequences that provide at least one question and at least one answer, the combination of which provides a game event (such as a game question/answer event for a trivia game). The DVD-Video player is instructed to select 60 and play the string of video sequences corresponding to the pseudo-randomly selected (or generated) number. The DVD-Video player may also be instructed to store the selected (or generated) number in a register or other suitable memory in the DVD-Video player, for comparison with later selected (or generated) numbers to avoid replaying of the same content items in the same session, as described below.

Figure 4:
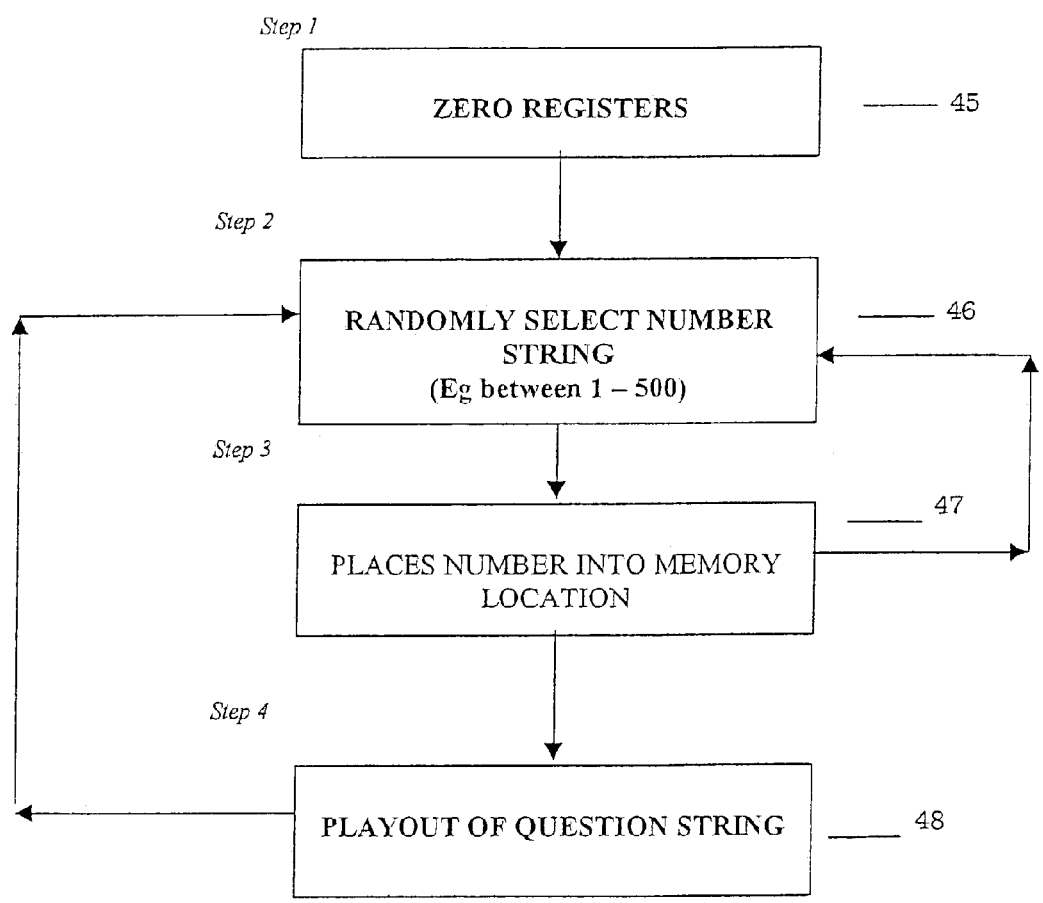
FIG. 4 is a flow chart, representing an embodiment of a portion of the process of FIG. 3.
Figure 5A:
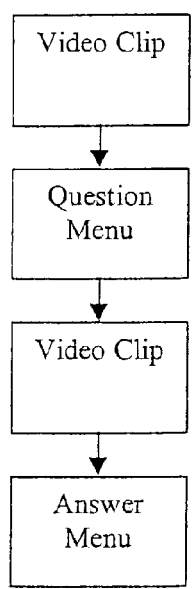
FIGS. 5a–5d are diagrams representing examples of video sequences.
Figure 5B:
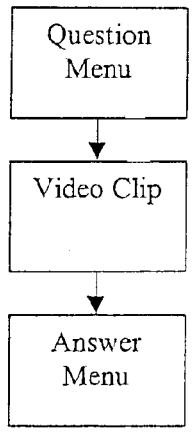
Figure 5C:
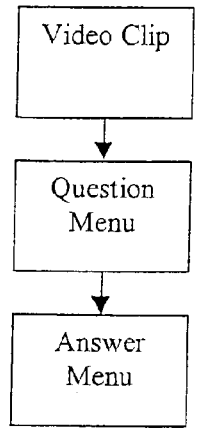
Figure 5D:
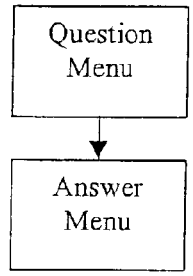

An example of a process carried out by the DVD-Video player to select and play a string of video sequences is shown in the flow chart of FIG. 4, wherein, the DVD-Video player registers or memory is initialized (for example, to zero) at the beginning of a session in step 45, then a number associated with one of the first plurality of content items is selected by pseudo-random selection in step 46, the selected number is stored in a defined register or other memory location of the DVD-Video player in step 47 and, in step 48, the DVD-Video player controller selects and plays the content item (for example, a question string of video sequences) associated with the selected (or generated) number. Following step 48, the process returns to step 46 for the selection (or generation) of a new number and, thus, the selection and display of a further content item (such as a further question string). The process will continue until a user ends the game or all of the stored content items have been displayed in a continuous session.

As discussed below, in a preferred embodiment of step 47, prior to storing the selected (or generated) number, the DVD-Video player controller may be instructed to check if the selected (or generated) number is already stored in a register or memory location of the DVD-Video player (which would indicate that the selected number had been previously selected in the same session). If the selected (or generated) number matches a previously stored number, then the process may return to step 46, wherein a new number is selected or generated by pseudo-randomly. Once a new number is selected (or generated) that does not match a stored number that was previously selected or generated), the sting of video sequences associated with the new number is displayed.

The string of video sequences may comprise at least one video sequence associated with a question and an answer. As shown in FIGS. 5a through 5d, each video sequence may be composed of a plurality of video clips and displayable items. In one embodiment shown in FIG. 5a, the string of video sequences comprises a first video clip, followed by a question menu, followed by a second video clip, followed by an answer menu. In a second embodiment shown in FIG. 5b, the string of video sequences comprises a question menu, followed by a video clip, followed by an answer menu. In a third embodiment shown in FIG. 5c, the string of video sequences comprises a video clip, followed by a question menu, followed by an answer menu. In a fourth embodiment shown in FIG. 5d, the string of video sequences comprises a question menu followed by an answer menu. The examples shown in FIGS. 5a through 5d are not intended to be limiting and other suitable embodiments of strings of video sequences may be employed in accordance with further embodiments of the present invention.

The string of video sequences may, for example, begin with a question sequence 62, in which a short video/audio clip is played for the user, ending with the display of a question and/or question menu. In an example embodiment, the short video/audio clip may be a short clip taken from a full-length movie, television show, cartoon, audio program or the like. The question may be displayed as a visible text message and/or as an audio message.

For example, the question may comprise a trivia question about the preceding short clip, such as a question requiring the user to remember something about the content of the short clip, such as a question about the color of a garment worn by an actor in the clip, the name of an actor or character the clip, or the like. A question menu may display the question and multiple possible responses, such as TRUE or FALSE, YES or NO, or other possible multiple choice answers. As described above, the question preferably relates to the content of the video/audio clip played in the beginning of the question sequence. For example, a video/audio sequence of a Mickey Mouse™ cartoon may be followed by a question menu that provides the question: "What color was Mickey's hat," and a menu of selectable responses, such as: (a) red, (b) green, (c) blue, (d) Mickey had no hat.

The question menu may also display 64 a timer, countdown timer, clock or other indicia, representing a delay time or a time period remaining for the user to complete answering the question. In addition, background audio, such as background music, may be played during the delay time. Embodiments may employ a timer, such as a timer or time clock associated with the DVD-Video player, to automatically determine the expiration of a pre-defined delay period from the initial display of the question menu. In such embodiments, the process proceeds to an answer video sequence, automatically upon the expiration of the pre-defined period. Thus, in such embodiments, the user may employ the delay period to provide and record 66 an answer to the question posed by the question sequence, during which time the DVD-Video player controller is controlled to check whether or not the delay period has expired 68. In other embodiments, the question menu may continue to be displayed until the user enters a command to proceed with the answer video sequence. The user may be instructed to enter the command, for example, by using an appropriate operator on the user-input means (such as the remote control device 16).

Upon expiration of the pre-defined delay period or upon receipt of a user's command to proceed, another short video/audio clip is played 70, which includes or ends with the display of the correct answer corresponding to the question. Once the previous question string has been completed, the user is presented with an option to continue to the next question. The user may be provided with instructions for selecting the option to continue 72, for example, by using an appropriate operator on the user-input means (such as the remote control device 16).

If the user selects the option to continue, then the DVD-Video player controller is instructed to pseudo-randomly select or generate a new number from a the available numbers. In a preferred embodiment, the DVD-Video player controller is instructed to search its registers and compare the new selected or generated number with any other numbers that may be stored in the registers from previous selections or generations. If the new number was already present in the registers (i.e., the same number had been previously selected or generated during the same game), then the DVD-Video player controller is instructed to pseudo-randomly select or generate another new number from the available numbers. Alternatively, the DVD-Video player controller may be instructed to select the next succeeding or preceding number in the range or set as another new number. That number is also compared with previously stored numbers in the DVD-Video player registers. This process continues, until a number is selected or generated that has not been previously selected or generated in the same game.

Once a new number is selected or generated that is not present in the registers of previously selected or generated numbers, then the string of video sequences (including question and answer sequences) corresponding to the new number is played. The question and answer sequences associated with the new number proceed in a manner similar to the manner discussed above with respect' to the first string of video sequences played in the game. Further numbers may be selected or generated and further strings of video sequences may be displayed in a similar manner, to continue the game.

During the delay period (between a question sequence and an answer sequence), the user may answer the question orally or may record the user's answer, for example, using simple recording tools such as pen or pencil and paper. Of course, other recording tools may be employed, including but not limited to other writing implements, electronic recording devices or mechanical tally devices. In contexts in which a more sophisticated media player is employed, the user may select and record his or her answer, for example, by using appropriate operators on the user input means (such as a remote control device 16). Multiple user's may compare their recorded answers to compete for the greatest number of correct answers.

In further embodiments, a game board may be employed with the game. For example, a game board may have a plurality of locations (spaces) on which an object (game piece) may be moved. The plural locations may lead to a final or winning location. Game players may move objects (game pieces) to various locations (spaces) on the board, based on whether or not they provided a correct answer to a question. Thus, for example, each game player may be allowed to move one space toward the final or winning location, each time that player answers a correct question. The game may require a player to move one space backward, if a question is incorrectly answered. The game may also provide bonus questions that allow movement of more than one space. In yet further embodiments, each question sequence may include and display further information indicating the number of spaces (one, two, three, etc.) that a player must move if the question is answered correctly and/or is answered incorrectly.

A second representative example of a process for playing a game involving questions relating to content items stored on the DVD storage medium (disc) 28 employs an alternative to the manner of random selection or generation of content items (such as video sequences). The second example provides a more effective use of the DVD-Video player's memory and avoids problems associated with repeated selection of the same content items.

According to the second representative example, the DVD storage medium 28 includes a plurality of pseudo-randomly selectable content items, such as video sequences as described above with respect to the first representative example. In addition, the DVD storage medium stores a plurality of lists of content item (or video sequence) identification codes or numbers. Each list (or bank) of numbers may be created, for example, by pseudo-randomly selecting or generating codes or numbers from the available codes or numbers and arranging the selected or generated codes or numbers in a list order based on the order in which they were selected or generated. Preferably, each list (or bank) may be composed of a plurality of codes or numbers in a different order than any of the other of the plurality of lists. In such an embodiment, each list (or bank) may include the same codes or numbers, albeit in a different order than other lists. Also, each list (or bank) may include the codes or numbers for every one of the plurality of pseudo-randomly selectable content items.

Each of the plurality of lists (or banks) of content items is associated with a list code or number. The DVD storage medium further includes software for instructing the DVD-Video player controller to select or generate a code or number from the available list codes or list numbers. In this manner, the DVD storage medium may randomly select one list (bank) from the plurality of lists (banks). The DVD-Video player controller is then controlled to play the content items in the list (bank), based on the order of content items in the list (bank). Thus, if the content items comprise video/audio question and answer sequences as described above, then the DVD-Video player will pseudo-randomly select a list (bank) and play the first question and answer sequence in the list (bank). If the user elects to proceed with the game after the first question and answer sequence are displayed, then the second question and answer sequence in the selected list (bank) is played, and so forth.

Once the user ends the game, a new game may be started, for example, by re-inserting the DVD storage medium into the DVD-Video player. As part of the new game, the DVD-Video player controller will be controlled to pseudo-randomly select a list (bank) from the available lists (banks). If a suitably large number of lists (banks) are available on the DVD storage medium, then because the selection is pseudo-random, it is not likely that the same list (bank) will be selected in successive games. The larger the number of lists (banks) that are stored on the DVD storage medium, the greater the likelihood that successive games will not involve the same list. Thus, successive games will appear different to the user.

Figure 6:
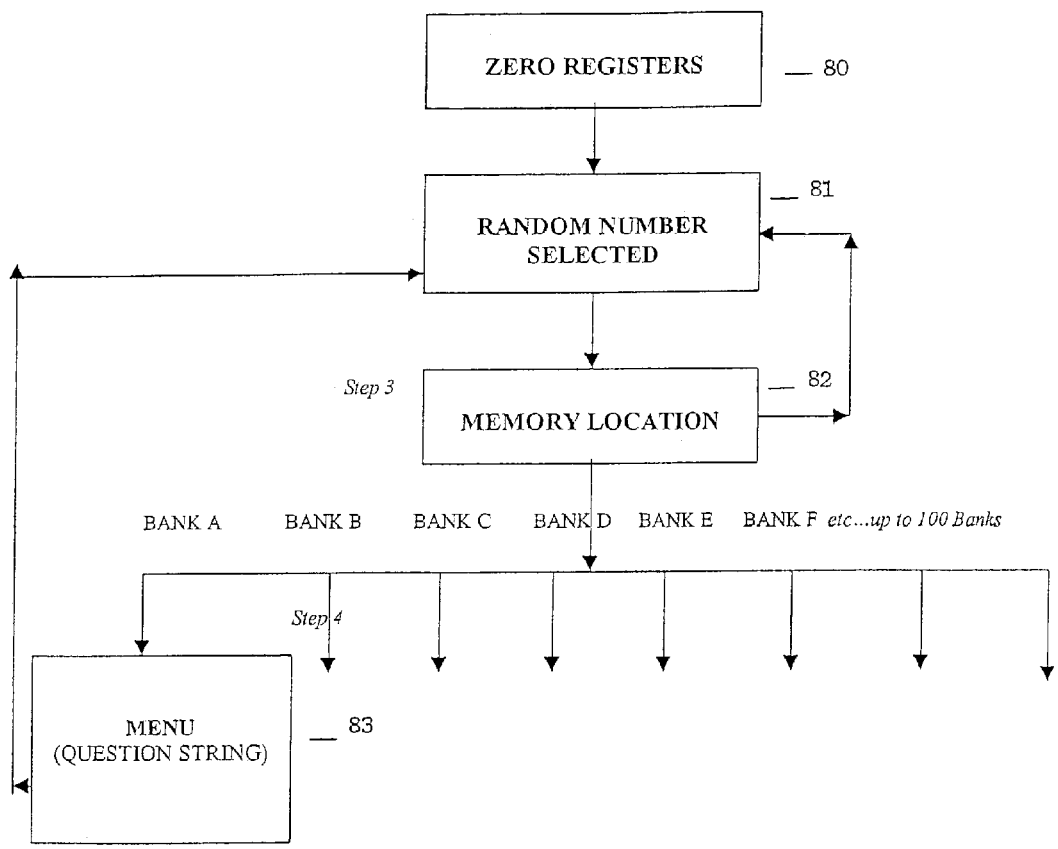
FIG. 6 is a flow chart, representing a further embodiment of a portion of the process of FIG. 3.

A representation of an example process involving content item lists (banks) is shown in FIG. 6, wherein a plurality of lists (banks) are associated with a corresponding plurality of list (bank) numbers. The DVD-Video player registers are initialized (e.g., by zeroing) at the beginning of a session as shown in step 80. Then, in step 81, one of the list (bank) numbers is generated or selected from the plurality of list (bank) numbers. Preferably, the selection (or generation) is. made by pseudo-random selection (or generation) from among the range or set of numbers associated with the plurality of lists (banks). In step 82, the selected list (bank) number is stored in a register or other suitable memory location of the DVD-Video player. Prior to storing the selected (or generated) number, the DVD-Video player controller may be instructed to check if the selected (or generated) number is already stored in a register or memory location of the DVD-Video player (which would indicate that the selected number had been previously selected in the same session). If the selected (or generated) number matches a previously stored number, then the process may return to step 81, wherein a new number is selected or generated pseudo-randomly.

Once a new list (bank) number has been selected or generated, the content items (such as question strings of video sequences) in the list (bank) corresponding to that list (bank) number are displayed in the order associated with the list (bank), as shown in step 83. Following the display of all of the content items in the list (bank) in step 83, the process may return to step 81 for the selection (or generation) of a new list (bank) number and, thus, the selection and display of further content items (such as a further question strings) associated with a further list (bank). The process will continue until a user ends the game or all of the lists (banks) of stored content items have been displayed in a continuous session.

Representative examples described above may be employed in games involving questions and answers relating to the pseudo-randomly selected content items (such as video sequences). In such examples, the game may involve trivia-like questions about the pseudo-randomly selected content items, such as, but not limited to, questions about the actors, scenes, objects in scenes or the like. The question and answer sequences are game events that allow a user to score, move or otherwise advance in the play of the game.

For example, the content items from which pseudo-random selection is made may comprise various sports plays which, when selected, are displayed with (in sequence or simultaneously) a question to the user to make an entry or record to select or identify the correct referee call for the play (e.g., foul or no foul, safe or out, fair play or penalty, or the like). The display of the sports play and question may be followed by a display of a correct referee call for the play, for example, following a brief pause to allow the user to enter or identify a correct referee call. For example, a user may enter a play call through an electronic user-input device, into an electronic recording system for keeping score of the user's responses. In one embodiment, the user input device comprises device 16 and the electronic recording system comprises the DVD-player controller, operating in accordance with instructions from software stored on the DVD storage medium 28. Alternatively or in addition, a user may be instructed to move to different specified game board locations, draw a card from a specified deck or perform other game functions, based on whether the user enters or identifies a correct or incorrect call, where the location on the game board, the draw of the card or other function is associated with an event of a game or progress toward an event of a game.

In another embodiment, the content items from which pseudo-random selection is made may comprise content associated with a video and/or audio scene or clip that is stopped just before the completion of an activity displayed in the content item. Thus, a sports play scene may be stopped just before the defining point of the play (such as, just before a ball reaches a player to either be caught or be dropped by a player, or just before a golf shot rolls to the hole to either fall in or pass by the hole). Alternatively, a video clip or audio clip may be stopped just prior to an interesting point in the clip (such as, just before an actor states a famous line or just before a singer reaches the chorus portion of a song). The user may be displayed a question, such as: "What happens next?" The user may, then, enter, record or otherwise identify a response (such as a guess as to how the activity displayed in the scene or clip will end). After a defined pause or after the user makes an entry or record or identifies a response, the user is provided audio and/or video content displaying the completion of the activity previously displayed in the pseudo-randomly selected content item. The user may record a score, move to specified locations on a game board, select specified cards or perform other functions associated with a game, depending upon whether the user's response to the question correctly matched the displayed completion of the activity.

In further embodiments, the randomly-selectable content items may be other types of game events, such as the draw of a card from a deck of cards, the roll of one or more dice, the position of a spinning pointer, or the like. Thus, in a further representative example, the above-described systems may be employed to select, by pseudo-random selection, a card from a deck of cards, the die face from a roll of one or more dice, the stopped position of a spinning pointer, or the like. In the context of a card game, the first plurality of randomly-selectable content items may comprise a plurality of audio or video sequences, where each different audio or video sequence represents a different card from the deck. For example, each first content item may comprise a video sequence for displaying the face of a card from the deck. In the context of a dice game, each different audio or video sequence may represent (e.g., display) a different face or different combination of faces of one or more dice. In the context of a game having a spinning pointer, each different audio or video sequence may represent (e.g., display) a different possible stopping position of the pointer.

By pseudo-random selection of content items from the first plurality of content items stored on the DVD storage medium, a number of conventional and non-conventional games may be played. For example, a card matching game may be played, where the user is provided with a deck of cards and a DVD storage medium 28. Upon placing the DVD storage medium in a DVD-Video player, the DVD-Video player is controlled (by software instructions on the DVD storage medium) to display opening and introduction video sequences, as described above.

Upon starting of the game, the user may be instructed (e.g., by an introduction video sequence) to place each card from the deck of cards on a flat surface, with the face of the card directed downward (out of sight of the user). The DVD-Video player is further controlled to select, by pseudo-random selection, at least one of the video sequences from the first plurality of video sequences stored on the DVD storage medium. The selected video sequence or sequences provide a display to the user of at least one card face.

The user is instructed to turn over one (or other defined number) of the face-down cards, to try to match the card face or faces displayed in the selected video sequence. If the user successfully finds a matching card, the user may either leave the matching card in a face-up position or remove the matching card from the rest of the cards. Either after a pre-defined time or upon the user selecting an option to proceed, the DVD-Video player is controlled to select, by pseudo-random selection, another video sequence from the first plurality of video sequences. The process carries on, with the display of a card face and the user attempting to match the displayed card face, in a similar manner as described above.

The user may successfully complete the game, by matching a predefined number of cards or by matching all of the cards in the deck to displayed card faces. In addition, a timing component may be included in the game, whereby the user achieves a numerical score, representing the number of successful matches made within a predefined time period. The matching of cards may be carried out for game or amusement purposes. In other embodiments, the system and process may be employed as an analysis tool, for example, to analyze the user's ability to remember card locations or to associate displayed cards with physical cards. Similar systems and processes may involve matching of other objects (other than cards).

According to another representative example, a game involving a spinning pointer may be played, where the user is provided with a game board or the like and is directed to move to particular positions on the board, based on the stopping position of a spinning pointer. The first plurality of pseudo-randomly selectable content items stored on the DVD storage medium 28 may, comprise, video sequences representing the possible stopping position of a spinning selector. The video sequences may include, for example, a famous actor or character describing or showing a stopping position.

While example embodiments described above relate to game playing and amusement activities, further embodiments may relate to educational, artistic and analytical activities. In such embodiments, the combination of a plurality of stored content items (e.g., video sequences) and ability to select from the plurality of stored content items by pseudo-random selection, can be employed in a variety of educational or artistic activities. For example, instead of providing trivia questions for game playing activities, the first plurality of stored content items may relate to structured lessons and questions relating to the lessons, to provide an educational function. Artistic processes may involve storing artistic content (such as music, visual art, graphics, or the like) as the first plurality of pseudo-randomly selectable content items stored on the DVD storage medium. In such processes, a user may create and display artistic sequences of content, based on the pseudo-random selection of content items stored on the DVD storage medium.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A system for playing recorded content on a DVD player, said DVD player having a DVD player controller, the system comprising:

a DVD storage medium storing a plurality of content items, each content item of said plurality of content items associated with a unique identification code of a plurality of identification codes, said DVD storage medium further storing a plurality of lists of identification codes of content items, each list of said plurality of lists including a pseudo random ordering of a plurality of said plurality of identification codes; and program software stored on a storage medium for controlling the DVD controller to select a list from said plurality of lists, and for controlling the DVD controller to play content items of the plurality of content items in an order in which their associated identification codes appear in the selected list.

2. A system of claim 1, wherein the program software is stored on the DVD storage medium, for loading into a DVD player memory.

3. A system of claim 1, wherein each list of said plurality of lists includes every identification code of said plurality of identification codes in a different pseudo random order than all other lists of said plurality of lists.

4. A system of claim 1, wherein the program software controls the DVD controller to select by pseudo random selection said list from said plurality of lists.

5. A system of claim 4, wherein each list of said plurality of lists includes every identification code of said plurality of identification codes in a different sequential order than all other lists of said plurality of lists.

6. A method of playing recorded content on a DVD player, said DVD player having a DVD controller, the method comprising:

storing, on a DVD storage medium, a plurality of strings of content items that include content for a game;

associating the plurality of strings of content items with a corresponding plurality of identification codes such that each string of content items is associated with a corresponding identification code that is different from the identification codes of all other strings of content items;

controlling said DVD controller to select, by pseudo-random selection, an identification code from the plurality of identification codes;

playing the string of content items corresponding to the selected identification code; and repeating said controlling and playing steps at least once.

7. A method according to claim 6, wherein the step of playing the string of content items comprises:

displaying at least one first video clip or audio clip having at least one question;

displaying at least one second video clip or audio clip having at least one answer corresponding to the at least one question; and providing a period of time between the display of the end of the first video or audio clip and the beginning of the second video or audio clip.

8. A method according to claim 7, wherein a third video or audio clip is displayed during the period of time between the first and second video or audio clips, and the third video or audio comprises content representing time remaining before the beginning of the second video or audio clip.

9. A method according to claim 7, wherein an audio music clip is displayed during the period of time between the first and second video or audio clips.

10. A method according to claim 7, wherein providing a period of time between the display of the first and second video or audio clips comprises delaying the display of the at least one second video clip or audio clip until receipt of a user command to display the at least one second video clip or audio clip.

11. A method according to claim 7, further comprising displaying a request for user input to continue the game, after displaying at least one second video clip or audio clip.

12. A method according to claim 11, further comprising receiving user input to continue the game and, in response, performing the step of repeating the controlling and playing steps; and wherein the step of repeating the controlling and playing steps, comprises:

controlling the DVD controller to select, by pseudo-random selection, at least one second identification code from the plurality of identification codes.

13. A method according to claim 12, further comprising:

storing the selected identification code in a DVD player memory of the DVD player; and wherein the step of repeating the controlling and playing steps, further comprises:

controlling the DVD controller to compare the second selected identification code with the stored selected identification code and to select a further identification code, if the second selected identification code matches the stored identification code.

14. A method according to claim 6, wherein the step of controlling the DVD controller to select the identification code comprises:

providing a plurality of banks of identification codes, each bank defining a sequence of the plurality of identification codes;

controlling the DVD controller to select, by pseudo-random selection, a bank of identification codes from the plurality of banks.

15. A method according to claim 14, wherein each bank in the plurality of banks comprises the same identification codes, but in a different sequential order, as the other banks in the plurality of banks.

16. A method according to claim 14, wherein playing the string of content items comprises playing the string of content items associated with a first identification code in the sequence defined by the selected bank.

17. A method according to claim 14, wherein playing the string of content items comprises playing a plurality of strings of content items associated with identification codes in the selected bank, in the sequence defined by the selected bank.

18. A system for playing recorded content on a media player, said media player having a media player controller, the system comprising:

a content storage medium storing a plurality of content items, each content item of said plurality of content items associated with a unique identification code of a plurality of identification codes, said content storage medium further storing a plurality of lists of identification codes of content items, each list of said plurality of lists including a pseudo random ordering of a plurality of said plurality of identification codes; and program software stored on a storage medium for controlling the media player controller to select a list from said plurality of lists, and for controlling the media player controller to play content items of the plurality of content items in an order in which their associated identification codes appear in the selected list.

19. A method of playing recorded content on a DVD player, said DVD player having a DVD controller, the method comprising:

storing, on a DVD storage medium, a plurality of content items, each content item of said plurality of content items associated with a unique identification code of a plurality of identification codes;

storing, on said DVD storage medium, a plurality of lists of identification codes of content items, each list of said plurality of lists including a pseudo random ordering of a plurality of said plurality of identification codes;

controlling the DVD controller with program software to select a list from said plurality of lists; and controlling the DVD controller with program software to play content items of the plurality of content items in an order in which their associated identification codes appear in the selected list.

20. A method of claim 19, wherein the step of controlling the DVD controller with program software to select a list from said plurality of lists, comprises:

controlling the DVD controller with the program software to select by pseudo random selection said list from said plurality of lists.

21. A method of claim 19, wherein each list of said plurality of lists includes every identification code of said plurality of identification codes in a different pseudo random order than all other lists of said plurality of lists.

22. A system for playing recorded content on a DVD player, said DVD player having a DVD controller, the system comprising:

a DVD storage medium storing a plurality of content items that may be played;

program software stored on a storage medium for controlling the DVD controller to repeatedly select, by pseudo random selection, content items from the plurality of content items; and at least one physical object;

wherein the function of the at least one physical object is associated with the selected content items.

23. A system of claim 22, wherein the at least one physical object comprises a deck of cards.

24. A system of claim 23, wherein the cards in the deck of cards are placed face down;

wherein each content item of the selected content items displays a card face; and wherein a user turns over a card to try to match the card face displayed by each content item.

25. A system of claim 22, wherein the at least one physical object comprises:

a game board; and at least one game piece.

26. A system of claim 25, wherein the at least one game piece is moved to locations on the game board based on the selected content items.

27. A system of claim 26, wherein the game board has a plurality of spaces;

wherein each content item of the selected content items displays a question; and wherein a user moves the at least one game piece a specified number of spaces on the game board each time the user answers a question correctly.

28. A system of claim 26, wherein each content item of the selected content items displays a possible stopping position of a spinning pointer; and wherein a user moves to a location on the game board based on the position of the pointer.

29. A system of claim 22, wherein the at least one physical object comprises:

a writing pad; and a writing utensil.

30. A system of claim 29, wherein each content item of the selected content items displays a picture; and wherein a user draws the picture on the writing pad using the writing utensil.

31. A system of claim 22, further comprising:

a container;

wherein the at least one physical object and the DVD storage medium are stored in the container.

32. A method of playing recorded content on a DVD player, said DVD player having a DVD controller, the method comprising:

storing, on a DVD storage medium, a plurality of content items, each content item of said plurality of content items associated with a unique identification code of a plurality of identification codes;

storing, on said DVD storage medium, a plurality of lists of identification codes of content items, each list of said plurality of lists including a pseudo random ordering of a plurality of said plurality of identification codes;

controlling the DVD controller with program software to select a list from said plurality of lists;

controlling the DVD controller with program software to play content items of the plurality of content items in an order in which their associated identification codes appear in the selected list; and associating the function of at least one physical object with the played content items.

33. A method of claim 32, wherein associating the function of at least one physical object with the played content items comprises:

moving at least one game piece on a game board based on the played content items.

34. A method of claim 33, wherein moving at least one game piece on a game board based on the played content items comprises:

answering a question displayed by each content item of the played content items; and moving the at least one game piece a specified number of spaces on the game board if the question is answered correctly.

35. A method of claim 32, wherein associating the function of at least one physical object with the played content items comprises:

selecting a card from a deck of cards based on a card face displayed by each content item of the played content items.

36. A method of claim 32, wherein the step of controlling the DVD controller with program software to select a list from said plurality of lists, comprises:

controlling the DVD controller with the program software to select by pseudo random selection said list from said plurality of lists.

37. A system of claim 18, wherein the program software is stored on the content storage medium.

38. A system of claim 18, wherein the program software controls the media player controller to select by pseudo random selection said list from said plurality of lists.

39. A system of claim 22, wherein the program software is stored on the DVD storage medium.

* * * * *